US010943137B2

(12) United States Patent
Choi et al.

(10) Patent No.: US 10,943,137 B2
(45) Date of Patent: Mar. 9, 2021

(54) BIOMETRIC DATA CAPTURING AND ANALYSIS

(71) Applicant: Computime Ltd., New Territories (HK)

(72) Inventors: Hung Bun Choi, Hong Kong (CN); Chun Kit Chu, Hong Kong (CN); Yau Wai Ng, Hong Kong (CN); Leung Yin Chan, Hong Kong (CN)

(73) Assignee: Computime Ltd., New Territories (HK)

( * ) Notice: Subject to any disclaimer, the term of this patent is extended or adjusted under 35 U.S.C. 154(b) by 0 days.

(21) Appl. No.: 16/559,814

(22) Filed: Sep. 4, 2019

(65) Prior Publication Data

US 2020/0082189 A1 Mar. 12, 2020

Related U.S. Application Data

(60) Provisional application No. 62/730,160, filed on Sep. 12, 2018.

(51) Int. Cl.
*G06K 9/00* (2006.01)
*B60N 2/00* (2006.01)
(Continued)

(52) U.S. Cl.
CPC ......... *G06K 9/00845* (2013.01); *B60N 2/002* (2013.01); *B60W 40/08* (2013.01);
(Continued)

(58) Field of Classification Search
CPC ........... G06K 9/00845; G06K 9/00369; B60N 2/002; B60W 40/08; B60W 2040/0809;
(Continued)

(56) References Cited

U.S. PATENT DOCUMENTS

2003/0214408 A1 11/2003 Grajales et al.
2009/0119047 A1* 5/2009 Zelin ................. G01N 27/3274
702/82
(Continued)

FOREIGN PATENT DOCUMENTS

| WO | 2018/201688 A1 | 11/2018 |
| WO | 2019/081975 A1 | 5/2019 |
| WO | 2019/103620 A2 | 5/2019 |

OTHER PUBLICATIONS

Mar. 6, 2020—International Search Report & Written Opinion—PCT/US2019/049666.
(Continued)

*Primary Examiner* — Omar Casillashernandez
(74) *Attorney, Agent, or Firm* — Banner & Witcoff, Ltd.

(57) ABSTRACT

A health condition of a person may be assessed from a thermal sensor signal. By increasing performance indices of a thermal camera (for example, resolution, frame rate, sensitivity), operation may be extended to identification verification, biometric data extraction and health condition analysis, and so forth. Prediction may be carried out by monitoring a time sequence of thermal images, and consequently early warning of the health condition may be provided. The apparatus may be used for, but not limited to, personalization of smart home devices through supervised and reinforcement learnings. The application of the apparatus may be, but not limited to, smart homes, smart buildings and smart vehicles, and so forth.

15 Claims, 10 Drawing Sheets

(51) Int. Cl.
*B60W 40/08* (2012.01)
*G05D 1/00* (2006.01)
*G06F 21/32* (2013.01)
*H04L 9/32* (2006.01)

(52) U.S. Cl.
CPC .......... *G05D 1/0061* (2013.01); *G06F 21/32* (2013.01); *G06K 9/00369* (2013.01); *H04L 9/3231* (2013.01); *B60W 2040/0809* (2013.01); *B60W 2040/0818* (2013.01); *B60W 2040/0881* (2013.01)

(58) Field of Classification Search
CPC .. B60W 2040/0818; B60W 2040/0881; G05D 1/0061; G06F 21/32; H04L 9/3231

USPC .......................................................... 340/576
See application file for complete search history.

(56) References Cited

U.S. PATENT DOCUMENTS

| | | |
|---|---|---|
| 2012/0095358 A1 | 4/2012 | Matsunaga et al. |
| 2013/0173926 A1 | 7/2013 | Morese et al. |
| 2013/0314536 A1 | 11/2013 | Frank et al. |
| 2014/0276090 A1 | 9/2014 | Breed |
| 2015/0094914 A1* | 4/2015 | Abreu ................ B60H 1/00742 701/41 |
| 2016/0152180 A1 | 6/2016 | Kirsch et al. |
| 2017/0095157 A1* | 4/2017 | Tzvieli ................ A61B 5/0077 |
| 2017/0124853 A1* | 5/2017 | Mehta ..................... H04W 4/90 |
| 2017/0249433 A1 | 8/2017 | Hagen et al. |
| 2017/0374065 A1* | 12/2017 | Shtraym |
| 2018/0082037 A1* | 3/2018 | Arbouzov ............ A61B 5/0816 |
| 2018/0114329 A1 | 4/2018 | Wexler et al. |

OTHER PUBLICATIONS

Nov. 27, 2020—(WO) International Search Report and Written Opinion application PCT/US20/49127.

* cited by examiner

BIOMETRIC DATA CAPTURING AND ANALYSIS

This patent application claims priority to U.S. provisional patent application Ser. No. 62/730,160 entitled "Biometric Data Capturing and Analysis" filed on Sep. 12, 2018, which is hereby incorporated by reference in its entirety.

TECHNICAL FIELD

Aspects of the disclosure relate to extracting biometric data from a sequence of thermal sensor images. The thermal sensor may comprise of an array of thermal sensing elements to increase the performance.

BACKGROUND OF THE INVENTION

Image sensors are popular for home applications. Examples include those used for a baby monitor, internet protocol (IP) camera, security camera, and so. Other image sensors include thermal cameras as well as an array of thermal sensors. Expanding the effective applications of image sensors would enhance the popularity.

The need to expand the application of sensors (for example, thermal sensors) is underscored by an article reported in the Chicago Sun Times in May 2019 about an Illinois man who died after suffering a heart-related event while driving and crashing his vehicle. The man was driving when he suffered a "heart-related event," lost consciousness, and crashed his vehicle into a utility pole. After crashing into the pole, his car struck another vehicle. Preventive measures addressing such horrific events would certainly be beneficial to the general population.

SUMMARY OF THE INVENTION

An apparatus uses a thermal sensor for biometric data extraction and tracking for smart home applications. Applications such as health condition analysis, motion estimation (for example, fall estimation), casual prediction (for example, heart beat is slowing down to a hazardous level), hazard detection (for example, laying down for a long time), learning the profile of individuals, and system adaptation according to individual preferences.

With another aspect, parameters of a thermal sensor may be enhanced to allow as much data to be extracted as possible. Examples include, but not limited to: increasing the number of sensing element (i.e., the resolution), frame rate, sensitivity, and/or signal-to-noise level.

With another aspect, signal processing techniques extract biometric data from the thermal images.

With another aspect, an analytic model is used for hazard prediction and subsequently associated actions taken.

With another aspect, hazard analysis is done by a deep learning model. Actions are taking based on the hazard coefficients with the associated confidence levels estimated from the model.

With another aspect, the model would suggest actions to be taken with the associated confidence levels based on the input data sequence.

With another aspect, the model may be trained to predict the hazard coefficients, and the corresponding actions if necessary, with the corresponding confidence levels based on the events previously occurring.

With another aspect, the model may reside in a cloud server rather than a local processing unit for applications that are less time critical.

With another aspect, parameters of a smart device are configured differently based on a thermal signature of a detected person.

With another aspect, an executed application is changed from a first application to a second application based on a detected condition detected by the first application.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
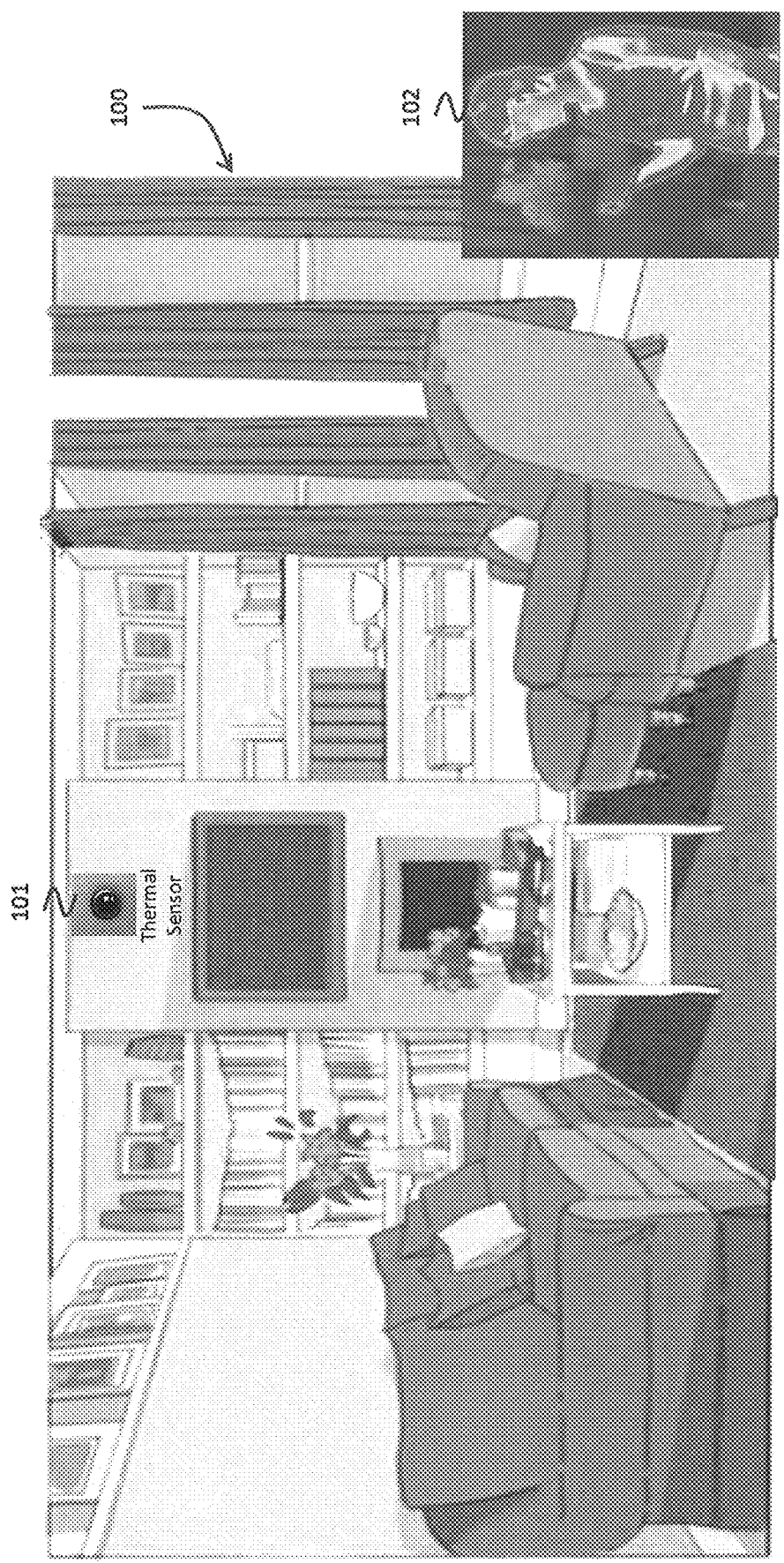
FIG. 1 shows a thermal sensor positioned in a room in accordance with an embodiment.

According to an aspect of the embodiments, performance indices (for example, resolution, frame rate, and sensitivity) of a thermal sensor or an array of thermal sensors may be increased to support applications such as identification verification, biometric data extraction, and health condition analysis. Prediction may be carried out by monitoring a time sequence of thermal images and consequently an early warning of the health condition may be generated.

With another aspect of the embodiments, the frame rate of a thermal sensor may be increased to a determined level to capture the change in the minor details in the thermal radiation from a human body against time, for example, the detail change in the thermal radiation from human body.

With another aspect of the embodiments, the thermal image of the blood flows through the skin may be converted to a time signal for pulse rate extraction. Further signal processing techniques may be applied to extra biometric data of an individual for analyzing the health condition. An image signal may be processed to identify multiple objects from the content and to track associated biometric data.

With another aspect of the embodiments, an application may determine the position of a human body within the image signal, together with motion tracking from the previous images, for fall detection. Motion estimation may be applied to predict if there is any hazard to the individuals within the image signal.

With another aspect of the embodiments, a profile may be associated to an individual. An apparatus may track and learn the behavior of the individual from the history of image signal. Moreover, the apparatus may adapt when the individual is detected in the scene. For example, the set temperature of the air conditioner in the sitting room may be adapted to an individual's preference when the individual is detected going into the sitting room in the summer time.

With another aspect of the embodiments, the environment temperature can be controlled according to the body temperature of individual(s), together with other parameters (such as relative humidity and outside temperature, and so forth) to reach the overall comfort zone through machine learning.

With another aspect of the embodiments, the accuracy of an analysis is determined by the resolution, sampling frequency and sensitivity of a thermal sensor, signal processing techniques in extracting biometric data from the image signals, and analytic/learning algorithms.

With another aspect of the embodiments, applications of thermal sensors may be extended to domestic applications.

With another aspect of the embodiments, the analytic model is composed of a trained model. The model is trained from a database of reference thermal image signals and an associated target vector, which may represent a series of settings for the smart home devices. Reinforcement learning may be deployed to allow the model to adapt to a new target vector. For example, a user may change the temperature setting of a room between summer and winter.

With another aspect of the embodiments, no training is applied to the analytic model but learning from the sequence of target vectors over time that is associated with a thermal signature. For example when a new thermal signature, which is associated with a new user, is detected, a default setting for the smart him devices is applied. When the user changes the setting of individual device, the new setting would be recorded for re-training the model.

FIG. 1 shows thermal camera 101 positioned in room 100 in accordance with an embodiment. Camera 101 may generate thermal image (thermogram) 102 of an individual not explicitly shown.

With some embodiments, thermal camera 101 comprises a lens that focuses infrared or far-infrared radiation by objects in view. The focused light is scanned by a thermal sensor, which comprises a plurality of infrared-detector elements (for example, 24 by 32 pixels). The detector elements may create a very detailed temperature pattern (for example, thermogram 102).

With some embodiments, camera 101 may require one-hundredth of a second for the detector array to obtain sensor information to obtain the thermal image. The sensor information may be periodically obtained from several thousand points in the field of view of the thermal sensor to form a sequence of thermal images.

Thermogram 102 created by the detector elements of the thermal sensor may be converted into electric impulses. The impulses are then sent, to a signal-processing unit (for example, apparatus 300 as shown in FIG. 3), which may be implemented as a circuit board with a dedicated chip that converts the sensor information into biometric data.

Thermal camera 101 may also include a tracking capability so that the direction of camera 101 may vary to track a moving object such as person 102 moving in room 100.

While FIG. 1 depicts one thermal sensor, some embodiments may interface with a plurality of thermal sensors. For example, thermal sensor arrays may be positioned in different rooms and/or at entry points of a dwelling.

Figure 2:
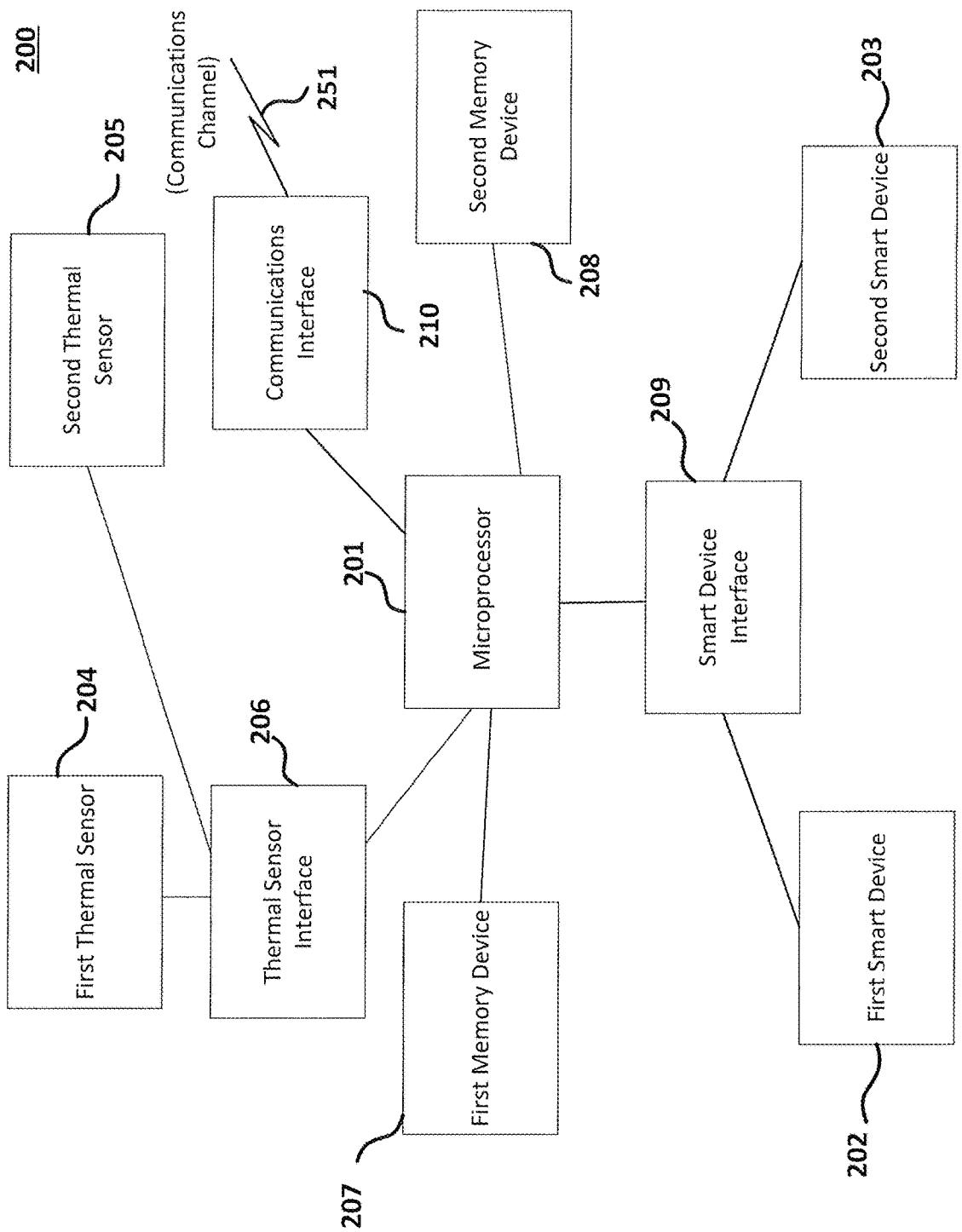
FIG. 2 shows an apparatus interfacing with one or more thermal sensors and one or more associated smart devices in accordance with an embodiment.

FIG. 2 shows apparatus 200 interfacing with thermal sensor 204 and/or 205 through sensor interface 206 and smart devices 202 and/or 203 through smart device interface 209 in accordance with an embodiment.

Thermal sensors 204 and 205 are often used for access control and presence detection. With some embodiments, in order for processor 201 to extract biometric data from sensor information, the performance of thermal sensor 204 may be extended by increasing the sample frequency (for example, frame rate) of capturing the image signal, identifying and tracking individuals from the image signal, and analyzing detail changes in thermal images against time. Processor 201 may convert sensor information (signals) to biometric data, such as heart rate, body position, health condition, and so forth. Apparatus 200 may also support prediction of future health events may by processing the image signals and/or support system personalization.

With some embodiments, processor 201 may process sensor information to detect a thermal signature of a user. When a thermal signature of a particular individual is detected, processor 201 may apply the individual's profile (for example, a temperature setting) to smart device 202 (for example, an air conditioner).

Processor 201 may support one or more health applications that processes and/or analyzes biometric data and may generate notifications about the biometric data to an external entity (for example, a doctor) over communications channel 251 via interface 210. As an example, a health application may detect that a user is having a possible heart attack from the biometric data; consequently, an urgent notification is sent to the user's doctor about the event.

With reference to FIG. 2, a computing system environment may include a computing device where the processes (for example, process 300 shown in FIG. 3) discussed herein may be implemented. The computing device may include processor 201 for controlling overall operation of the computing device and its associated components, including RAM, ROM, communications module, and first memory device 207. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, processor 201 may execute computer-executable instructions stored at memory 207 and access profile data stored at memory 208.

With some embodiments, memory devices 207 and 208 may be physically implemented within a single memory device.

Figure 3A:
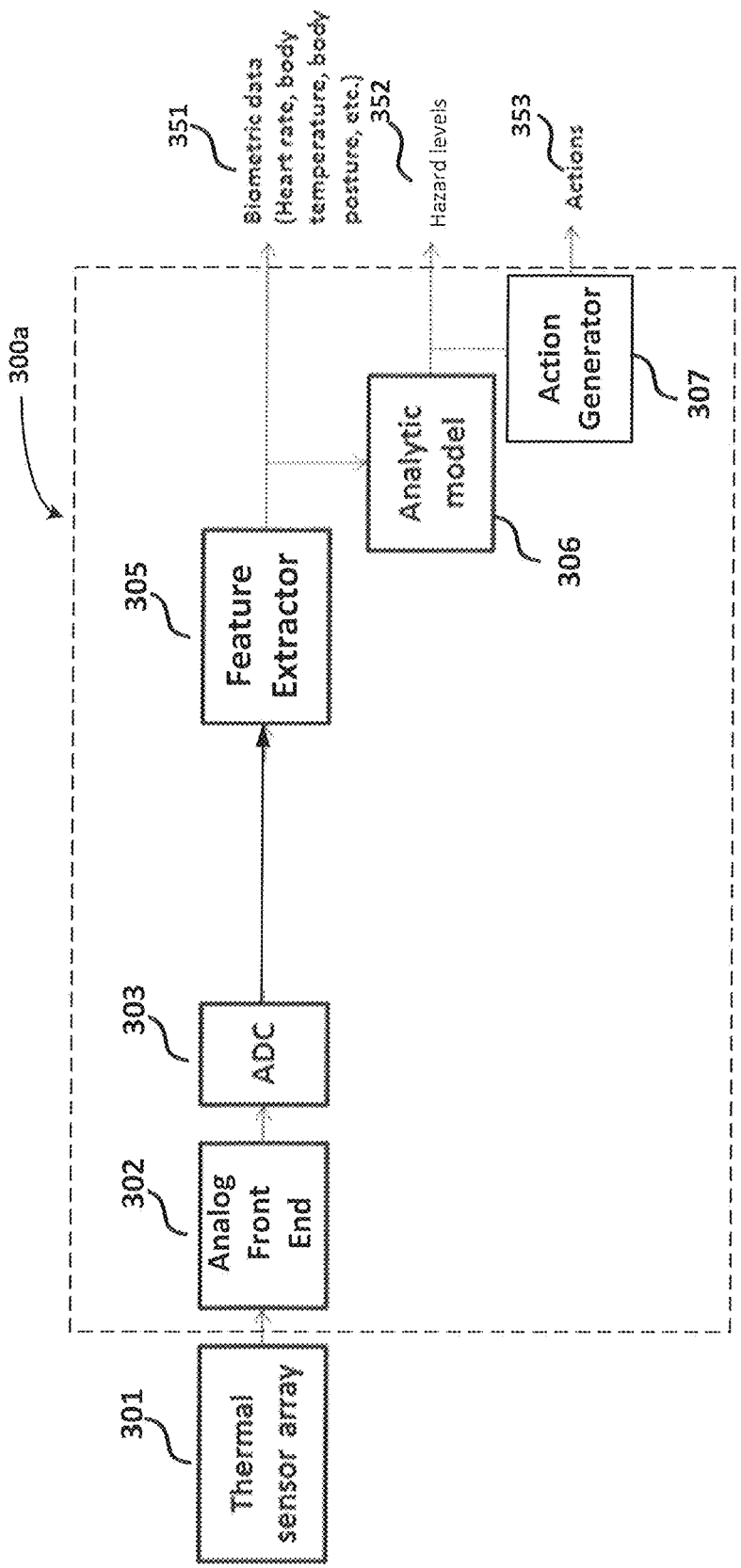
FIG. 3a shows an apparatus that processes information from one or more thermal sensors in accordance with an embodiment.

FIG. 3*a* shows apparatus 300*a* that processes information from one or more thermal sensors 301 in accordance with an embodiment.

By using a higher quality thermal sensor 301 (for example, with a frame rate of at least 100 frames per second, resolution of at least 24×32 pixels, good sensitivity, and low noise), biometric data 351 may be extracted via appropriate signal processing techniques via analog front end 302, analog to digital convertor (ADC) 303, and feature extractor 305. Biometric data 351 may include pulse rate, body temperature, temperature distribution pattern, body contour and posture, and so forth. By tracking the variations of biometric data, the health condition of an individual may be analyzed by analyzer 306, and early warning signals 352 and 353 may be generated by analyzer 306 and action generator 307, respectively, by further processing biometric data 351.

An application may utilize a domestic thermal camera installed for fall detection by tracking the change of posture. For example, when the posture changes from upright to horizontal in a short time, a possible fall may be detected and hence an associated alert may be generated. Moreover, a variation of posture, body temperature, temperature distribution pattern, and heart rate may be tracked to estimate the hazard level, and associated actions 353 can be taken.

Hazard prediction from biometric data 351 may also be supported. For example, when one's body temperature is continuously dropping and his/her posture is shaking, the chance of a fall may be higher (as indicated by hazard level 352) and hence an alert may be generated (triggered) before a fall can occur.

Block 302 may perform signal amplification and non-recursive band-pass filtering, in which the analog signal corresponding to the thermal image is processed for DC offset removal, noise reduction and frequency limited before being processed by ADC 303. (With some embodiments, block 303 may comprise a 16-bit ADC with the sampling frequency (for example, 200 Hz) being set high enough to capture the details of temperature change of an object.)

In the feature extraction block 305, image processing is applied to identify valid objects, track the thermal profile of individual objects over time and extract the parameters from the thermal profile to form a feature vector. Examples of the parameters for the feature vector include period time, variation of the period times, certain time constants within each periodic cycle and their variations over time, etc. The analytic model 306 takes in the feature vector and compares it over a trained model. The model is pre-trained with a large set of generic feature vectors using deep learning algorithms, e.g. a deep neural network. Reinforcement learning may be deployed to allow the model to learn from the mistakes. Hazard levels may be provided for the identified objects. In block 307, a list of actions may be pre-defined and may be triggered based on the associated hazard levels.

Figure 3B:
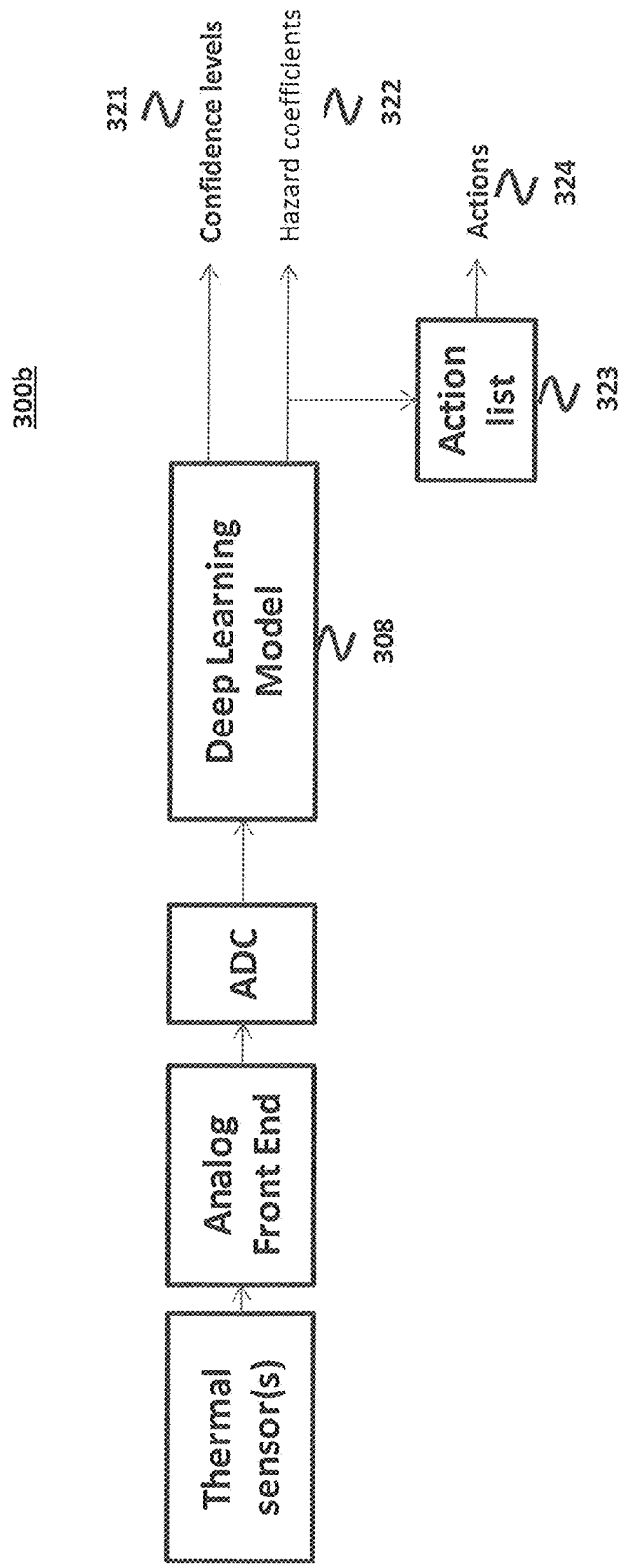
FIG. 3b shows an apparatus that processes information from one or more thermal sensors in accordance with another embodiment using a deep learning model to estimate the hazard coefficients.

FIG. 3*b* shows apparatus 300*b* that processes information from one or more thermal sensors 301 in accordance with another embodiment. Hazard coefficients 322 with associated confidence levels 321 are estimated by a model trained using a deep learning model 308, for example, a convolutional neural network with supervised learning. Actions 324 are determined from action list 323 and may be based on hazard coefficients 322 and confidence level 321 provided by model 308. Model 308 may initially support hazard levels but subsequently identify different hazards with more empirical data such as heart-rate abnormality, body temperature drop, fall detection, and so forth.

Model 308 in apparatus 300*b* may also be trained to predict hazards, rather than estimating hazards, based on the training sequence which started from a substantially earlier time.

Figure 3C:
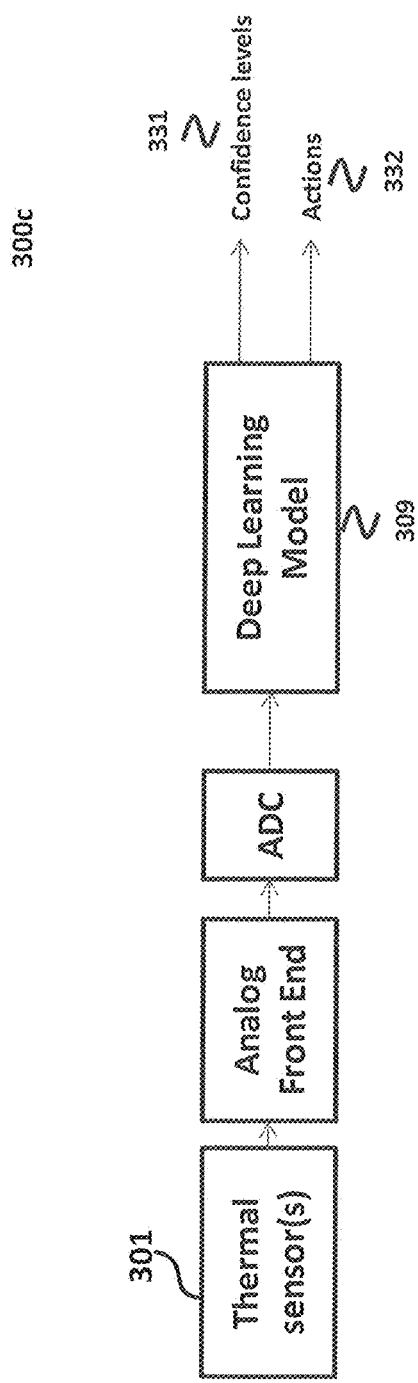
FIG. 3c shows an apparatus that processes information from one or more thermal sensors in accordance with another embodiment using a deep learning model to suggest the actions.

FIG. 3*c* shows apparatus 300*c* that processes information from one or more thermal sensors 301 in accordance with a third embodiment, in which actions 332 and associated confidence levels 331 are estimated by trained model 309. Again, model 309 in apparatus 300*c* also may be trained to predict any actions needed.

The image processing technique that may be used depends on the system complexity, including the number of thermal sensors, the resolution of each thermal sensor, the list of hazards and actions, the system computation power and memory available, and so forth.

For the embodiments shown in FIGS. 3*a*, 3*b* and 3*c*, the analytic models may be implemented locally or in a cloud server, depending on criticality of response time.

Figure 4:
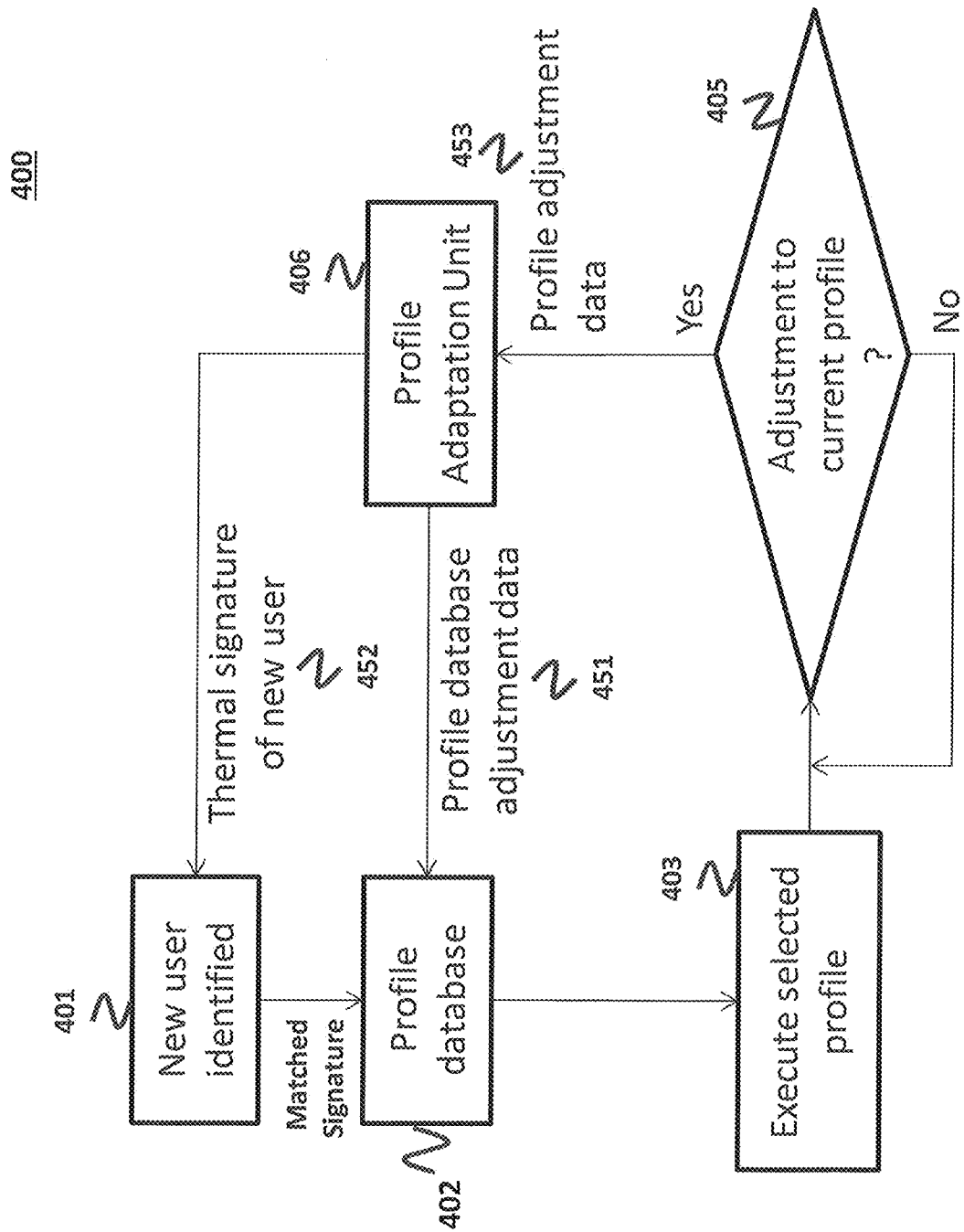
FIG. 4 shows a process that identifies a user from thermal sensor information and applies a corresponding profile in accordance with an embodiment.

FIG. 4 shows process 400 that identifies a user from thermal sensor information and applies a corresponding profile in accordance with an embodiment.

Process (application) 400 supports human presence detection and thermal signature verification at block 401. If a human object is detected and the thermal signature is matched to a known entity at block 401, all supported smart devices (for example, air conditioner, smart TV, or smart lighting) may be adjusted 403 in accordance with the profile database stored at block 402.

If there is any adjustment to the applied profile 405, the adjustment data 453 may be sent to a profile adaptation unit 406 in which the new settings in the profile may be included. The profile database would be updated 451 by profile adaptation unit 406 if an adjustment is needed.

To add a new user, profile adaptation unit 406 sends the thermal signature of the new user 453 to the user identifier unit 401 together with the associated profile, which could be a default profile, to the profile database unit 402.

Profile adaptation unit 406 may comprise a deep learning model trained using reinforcement learning.

Figure 5:
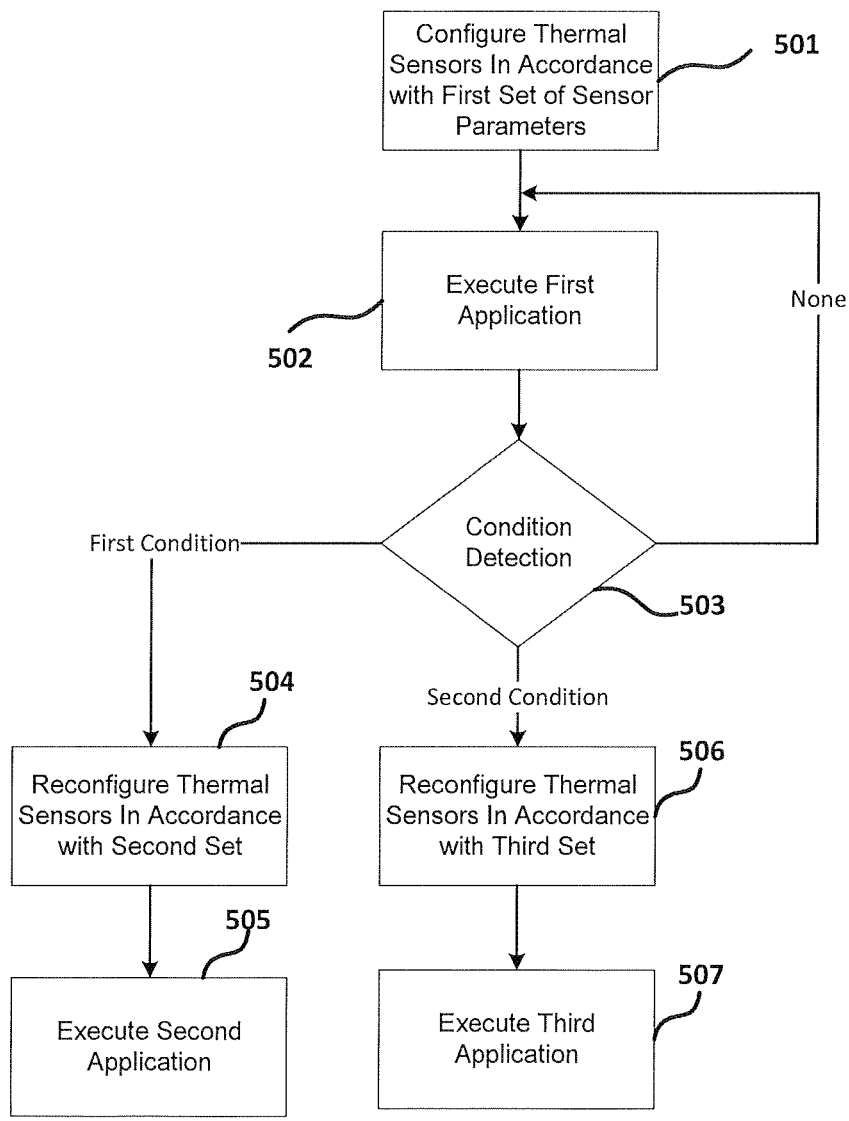
FIG. 5 shows a flowchart for executing a plurality of applications in accordance with an embodiment.

FIG. 5 shows flowchart 500 for sequencing through a plurality of applications, as executed by apparatus 200, in accordance with an embodiment. Apparatus 200 may execute one of the plurality of applications depending on a detected condition. For example, a first health application may monitor general health measurements (for example, an amount of activity and temperature) of a user. If one or more of the measurements are abnormal, apparatus 200 may initiate different health applications based on the detected condition.

Referring to FIG. 5, apparatus 200 configures thermal sensors 204 and 205 in accordance with a first set of sensor parameters at block 501 in order to execute a first application at block 502.

If an abnormal condition is detected at block 503, apparatus 200 initiates an appropriate application. For example, apparatus may transition to a second application to monitor fall prediction or to a third application to monitor the heart rate of the user at blocks 504-505 and 506-507, respectively. When executing the second or third applications, apparatus 200 may configure thermal sensors 204 and 205 differently in order to obtain different biometric data.

In another implementation, different configuration parameters may be applied to individual sensor for each application.

In a third implementation, different sets of configuration parameters are applied to the sensors one after another to extract all the biometric data before running the applications.

In a fourth implementation, a most comprehensive set of configuration parameters is used for all sensors and applications. All of the sensors may be set to the best set of configuration, for example but no limited to, highest image resolution, number of bits, frame rate, sensitivity, signal to noise ratio (SNR), computational power, power consumption, and so forth.

Figure 6:
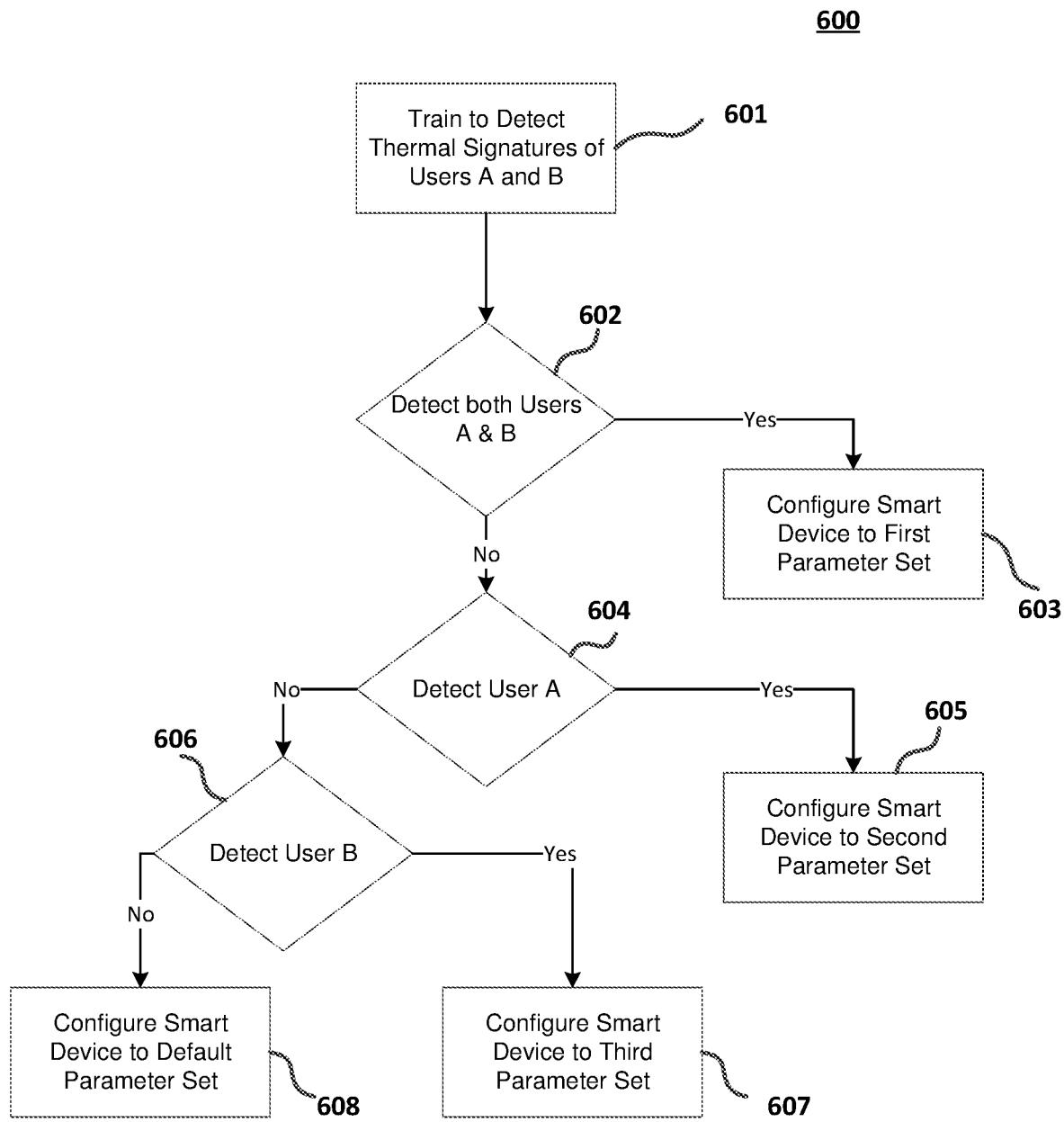
FIG. 6 shows a flowchart for configuring a smart device with one of a plurality of parameter sets based on detected thermal signatures in accordance with an embodiment.

FIG. 6 shows flowchart 600 where apparatus 200 configures a smart device with one of a plurality of parameter sets based on detected users in accordance with an embodiment. Apparatus 200 may monitor sensor data from thermal sensors 204 and/or 205 to detect thermal signatures of one or more users. For example, thermal sensor 204 may be positioned at an entry point of a dwelling. Based on sensor information obtained from sensor 204, apparatus 200 may identify users entering and exiting the dwelling. With some embodiments, apparatus may detect either a thermal signature from the front (corresponding to a person entering the dwelling) or from the back (corresponding to the person exiting the dwelling). Based on the detected thermal signatures, a smart device can be configured with different sets of parameters (for example, the temperature setting of an air conditioner).

At block 601, apparatus 200 trains to detect thermal signatures of different users from sensor data. For example distinguishing characteristics may be stored at memory 208. When thermal signatures of both users are detected at block 602, only user A at block 604, or only user B at block 606, a smart device may be configured in accordance with a first set of smart device parameters at block 603, a second set at block 605, or a third set at block 607, respectively. With some embodiments, the first set (when both users are detected) may be a compromise between the second and third sets (when only one user is detected). Otherwise (when no users are detected), the smart device may be configured in accordance with a default set of smart device parameters at block 608.

The following capabilities may be supported by the embodiments.

An apparatus uses a thermal sensor for biometric data extraction and tracking for smart home applications. Applications such as health condition analysis, motion estimation (for example, fall estimation), casual prediction (for example, heart beat is slowing down to hazard level), hazard detection (for example, laying down for a long time), learning the profile of individuals, and system adaptation according to individual preferences.

The parameters of a thermal sensor may be enhanced to allow as much data to be extracted as possible. Examples include, but not limited to:
a. Increasing the resolution, frame rate, sensitivity and signal-to-noise level, for example, for heart rate monitoring.
b. Increasing the resolution, sensitivity and signal-to-noise level, and so forth for detection distance.
c. Increasing the resolution for the number of tracked objects.

Signal processing techniques extract biometric data from thermal images.

Analytic model for hazards estimation and subsequently the associated actions taken.

Analytic model for actions estimation.

Analytic model for hazards and/or actions prediction.

Model for learning the behaviors of individual(s) to the smart devices according to the biometric data extracted from the thermal sensors.

Configure parameters of a smart device based on different detected people.

Change to a second health application from a first health application based on a detected condition by the first health application. The set of configuration parameters for individual sensors for an active health application may or may not be identical.

Use different set of configuration parameters to extract all biometric data before running the health applications.

Using a single comprehensive set of configuration parameters for all the sensors and health applications.

Obtain thermal sensor data to detect a thermal signature for either the front or the back of a person.

Able to increase the sampling frequency of thermal sensors, including IP cameras, thermal cameras, and thermal sensors, to capture the minor changes of the color content due to thermal radiation from a human body.

Able to increase the resolution and sensitivity of thermal sensors to span the detection range.

Exemplary Clauses:
1. An apparatus supporting at least one smart device, the apparatus comprising:
   a smart device interface;
   a thermal sensor interface configured to obtain sensor information from a first thermal sensor;
   a processor for executing computer-executable instructions;
   a memory storing the computer-executable instructions that when executed by the processor cause the apparatus to perform:
      detecting, from the sensor information, a detected thermal signature of a detected user;
      when the detected user is a first user, obtaining a first profile corresponding to the first user, wherein the first profile comprises a first set of smart device parameters; and
      when the detected user is the first user, configuring, through the smart device interface, a first smart device based on the first set of smart device parameters.

2. The apparatus of clause 1, wherein the memory storing computer-executable instructions that when executed by the processor further cause the apparatus to perform:
   when the detected user is a second user, obtaining a second profile corresponding to the second user, wherein the second profile comprises a second set of smart device parameters and wherein the second set is different from the first set; and when the detected user is the second user, configuring, through the smart device interface, the first smart device based on the second set of smart device parameters.

3. An apparatus supporting at least one smart application, the apparatus comprising:
   a thermal sensor interface configured to obtain sensor information from a first thermal sensor;
   a processor for executing computer-executable instructions;
   a memory storing the computer-executable instructions that when executed by the processor cause the apparatus to perform:
   when executing a first application:
      configuring the thermal sensor in accordance with a first set of sensor parameters;
      when the thermal sensor is configured with the first set of parameters, extracting biometric data from the sensor information; and
      when a first condition is detected from the biometric data, initiating a second application; and
   when executing the second application,
      configuring the thermal sensor in accordance with a second set of parameters, wherein the first and second sets differ by at least one parameter; and
      when the thermal sensor is configured with the second set of sensor parameters, extracting the biometric data from the sensor information.

4. An apparatus supporting at least one smart application, the apparatus comprising:
   a thermal sensor interface configured to obtain sensor information from a thermal sensor and configuring the thermal sensor in accordance with a most comprehensive set of sensor parameters for all applications;
   a processor for executing computer-executable instructions;
   a memory storing the computer-executable instructions that when executed by the processor cause the apparatus to perform:
   extracting biometric data from the sensor information;
   executing the first application;
   executing the second application.

5. An apparatus supporting at least one smart application with more than one thermal sensors, the apparatus comprising:
   a first thermal sensor interface configured to obtain sensor information from a first thermal sensor;
   a second sensor interface configured to obtain sensor information from a second thermal sensor;
   a processor for executing computer-executable instructions;
   a memory storing the computer-executable instructions that when executed by the processor cause the apparatus to perform:
   configuring the first thermal sensor in accordance with the first set of sensor parameters;
   configuring the second thermal sensor in accordance with the second set of sensor parameters;
   extracting biometric data from the sensor information from all the sensors;
   executing the first application:
   executing the second application.

With some embodiments, the sets of configuration parameters for all the sensors may be identical, in other words, all sensors can be configured with a most comprehensive set of parameters for all applications. The best sensor configuration may include, but not limited to, highest image resolution, number of bits, frame rate, sensitivity, and signal to noise ratio (SNR).

The following is directed to vehicle operator continuous physical health monitoring embodiments.

Referring back to FIG. 1, while embodiments support assessing the health of a person in a room using a thermal sensor, embodiments may utilize thermal sensor data to assess the health of a person within other types of confined spaces such as a vehicle. The parameters used may include, but is not limited to, heart rate, breathing rate, body temperature, posture (in particular, head position), and the trajectories of these data over time, and so forth.

The physical health condition of a vehicle operator (vehicle driver) may be critical to the safety of the operator, the passengers, and the vehicle itself. The state of the vehicle operator condition could determine the output of a situation should an emergency arises unexpectedly.

With traditional approaches, there are numbers of ways to monitor the physical health of the vehicle operator via wearables devices. However, a wearable device is specific to the individual wearing the device and not to the vehicle and may not ensure that the information or data of the vehicle operator's health is securely monitored during the duration of the vehicle when it is in use.

With an aspect of the embodiments, monitoring of a driver and/or vehicle may be performed in an non-intrusive and accurate manner that is activated all of the time that the vehicle is in operation. Consequently, the health of whoever is driving the vehicle may be assessed. With this approach, biometric information about the driver is utilized for accident prevention, incident alert, critical health warning and postmortem analysis.

Figure 7:
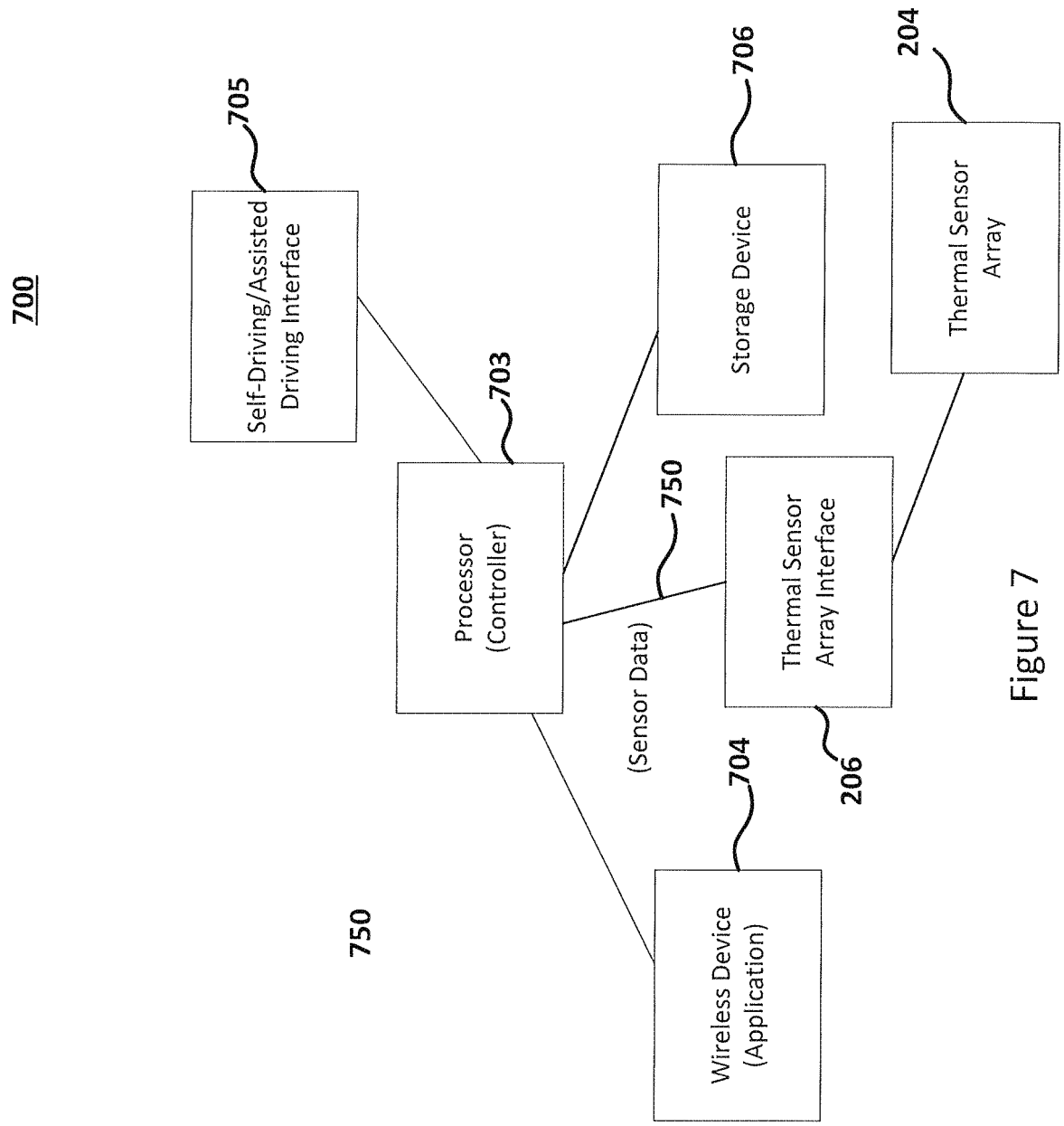
FIG. 7 shows a vehicular system for continuously monitoring a vehicular operator's physical health in accordance with an embodiment.

FIG. 7 shows vehicular system 700 for continuously monitoring a vehicular operator's physical health in accordance with an embodiment.

In reference to FIG. 2, the embodiment obtain thermal sensor data from thermal sensor 204 via thermal sensor interface 206 as previously discussed.

The thermal sensor 204 is typically fitted at a fixed location in front of the vehicle operator (driver), for example, mounted against the top windshield corner in front of the driver.

Processor 703 configures the thermal sensor by reference to methods in FIG. 5.

Processor 703 extracts biometric information contained in sensor data 750. For example, processor 703 may continuously monitor the heart rate and head posture about the driver as soon as he sits in the driving seat. In addition, the health record of the driver may be loaded into processor 703 via wireless devices 704 from a remote database server.

Processor 703 may decide addition biometric data are needed based on the health record of the driver. For example if the BMI of the driver exceeds a certain value, the change of heart rate, the change of body temperature, and change of head posture over time may also be monitored.

As will be discussed in further detail, processor 703 detects one or more current physical conditions about the driver and executes one or more actions to address the detected physical conditions.

Processor 703 may report detected physical conditions to the driver, doctor, emergency contact, and so forth via wireless device 704 (for example a smartphone) executing an application, initiating a telephone call to 911, generating an e-mail message to a designated person, and so forth.

Processor 703 may also initiate an action in response to the detected physical condition. For example, if processor 703 determines that the driver is experiencing a heart attack, processor may instruct self-driving interface 704 to route the vehicle to the nearest hospital.

As will be further discussed, biometric information may be stored in storage device 706 for subsequent analysis about the health condition of the vehicle driver. While storage device 706 is shown as a separate device, storage device 706 may be integrated within wireless device 704.

Figure 8:
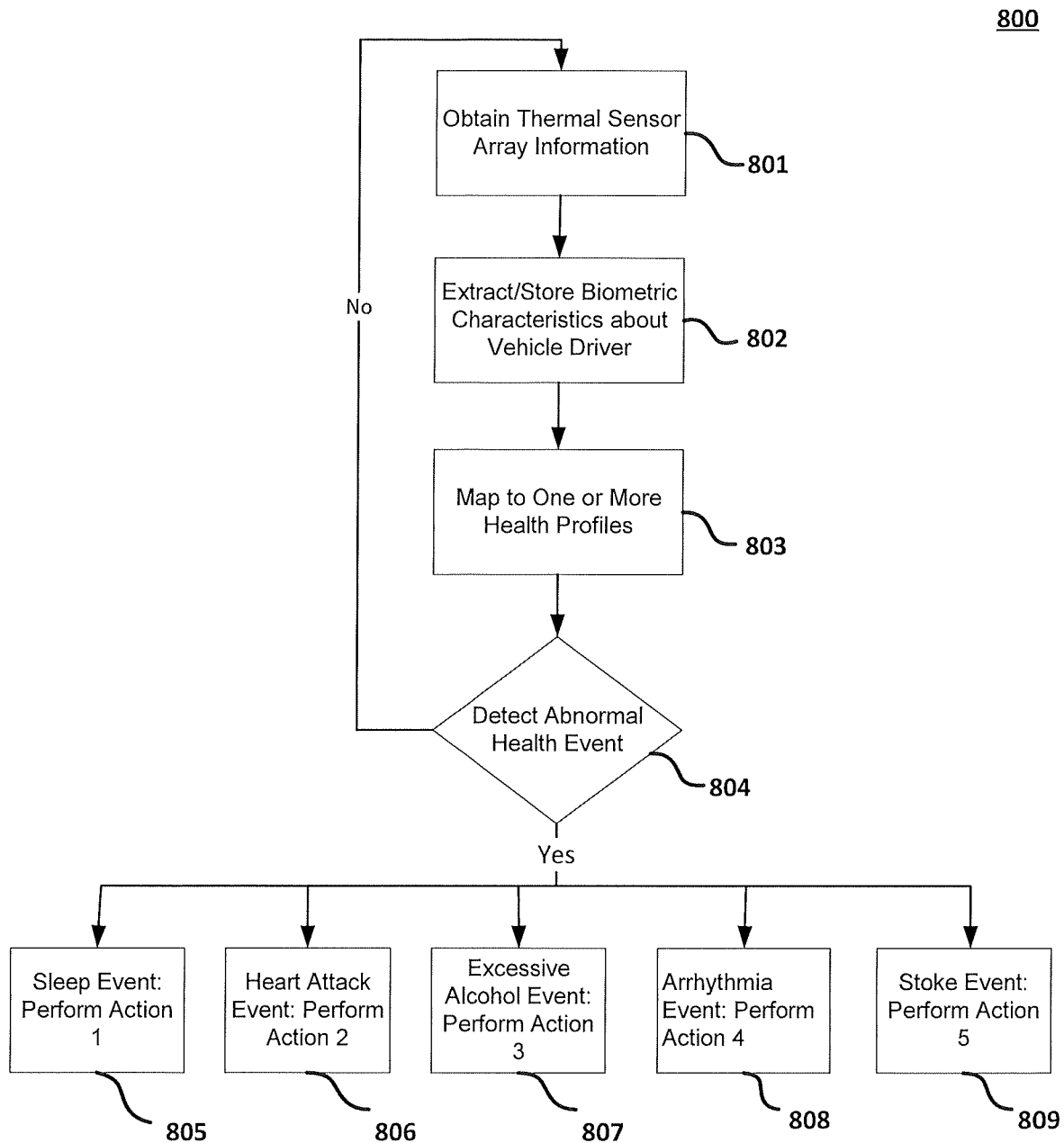
FIG. 8 shows a process that performs one or more actions based a detected physical condition of a vehicle driver in accordance with an embodiment.

FIG. 8 shows process 800 that performs one or more actions based a detected physical condition of a vehicle driver in accordance with an embodiment.

At block 801, processor 703 extracts biometric information contained in sensor data 750. Processor 703 processes the information conveyed in signal 750 to extract measurements for one or more biometric characteristics of the vehicle driver at block 802. Biometric characteristics may include, but are not limited to, heart rate, breathing rate, and deviation from average heart rate (for example, degree of heart beat irregularity).

The measurements of the biometric characteristics may be stored in storage device 706 for analysis about the health condition of the vehicle driver at a later time. For example, the stored data may be evaluated by the driver's doctor to determine if medical treatment is needed.

At block 803, process 800 obtains the measurements of the biometric characteristics (for example, the vehicle driver's heart rate and breathing rate) and determines whether a health profile applies to the drives. A plurality of health profiles may be specified, where a first health profile maps to normal vital functions of the driver (in other words, no detected health event), a second health profile maps to a heart attack event, a health third profile maps to the driver falling asleep, a fourth health profile maps to excessive alcohol consumption, and so forth.

If an abnormal health is detected based on the determined health profile is detected at block 804, process 800 detects whether a particular health event occurred at blocks 805-809. Based on a particular health event, process 800 executes an appropriate action. Exemplary actions include, but are not limited to:

Sleep event (block 805—driver falling asleep): initiate a loud warning sound through the vehicle radio or wireless device to alert the driver Heart attack event (block 806): instruct a self-driving interface to drive the vehicle to the nearest hospital Excessive alcohol consumption (block 807): prevent the vehicle driver from starting the car or safely parking the car if the car is moving Arrhythmia event (block 808—irregular heart beat or missing heart beats): generating an alert to the driver through a wireless device Stroke event (block 809): instruct a self-driving interface to drive the vehicle to the nearest hospital With an aspect of the embodiments, a processing unit continuously monitors and analyzes the heartbeat of a vehicle driver to generate an alert about any irregularity. The processing unit may use a unique algorithm to provide this capability.

With an aspect of the embodiments, a processing unit may identifying a detected irregularity to correspond to one of a plurality of events about a vehicle driver, including, but not limited to, falling asleep, a heart attack, consuming an excessive amount of alcohol, and so forth.

With an aspect of the embodiments, data about the heartbeat of a vehicle driver may be stored in a storage device. The data may be retrieved at a later time for analyzing whether an abnormal health event occurred.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. An apparatus supporting at least one smart application, the apparatus comprising:
   a thermal sensor interface configured to obtain sensor information about a person from a thermal sensor;
   a processor for executing computer-executable instructions;
   a memory storing the computer-executable instructions that when executed by the processor cause the apparatus to perform:
   when executing a first application,
      configuring the thermal sensor in accordance with a first set of sensor parameters;
      when the thermal sensor is configured with the first set of parameters, extracting first biometric data from the sensor information; and
      when a first condition is detected from the first biometric data, initiating a second application from the first application; and
   when executing the second application,
      configuring the thermal sensor in accordance with a second set of parameters, wherein the first and second sets differ by at least one parameter; and
      when the thermal sensor is configured with the second set of parameters, extracting the second biometric data from the sensor information, wherein the second biometric data is different from the first biometric data.

2. The apparatus of claim 1, wherein the memory storing computer-executable instructions that when executed by the processor further cause the apparatus to perform:
   when executing the first application:
   when a second condition is detected from the second biometric data, initiating a third application,
   wherein the second condition is different from the first condition.

3. The apparatus of claim 1, wherein the memory storing computer-executable instructions that when executed by the processor further cause the apparatus to perform:
   when executing the first application:
   when the first condition is indicative that the person is experiencing an abnormal health event, generating a notification about the first condition.

4. The apparatus of claim 1, wherein the memory storing computer-executable instructions that when executed by the processor further cause the apparatus to perform:
   predicting an occurrence of a health event of the person based on the first and second biometric data.

5. The apparatus of claim 2, wherein the memory storing computer-executable instructions that when executed by the processor further cause the apparatus to perform:
   determining a hazard level of an occurrence of a health event; and
   generating an action from a plurality of actions based on the hazard level.

6. An apparatus supporting at least one smart application, the apparatus comprising:
   a thermal sensor interface configured to obtain sensor information from a thermal sensor array and configuring a thermal sensor in accordance with a set of sensor parameters for all applications, wherein said all applications include a first application and a second application;
a processor for executing computer-executable instructions;
a memory storing the computer-executable instructions that when executed by the processor cause the apparatus to perform:
when executing the first application,
extracting first biometric data about a person from the sensor information; and
transitioning to the second application based on the extracted first biometric data; and
when executing the second application,
extracting second biometric data about the person from the sensor information, wherein the second biometric data is different from the first biometric data; and
monitoring the extracted second biometric data about the person.

7. The apparatus of claim 6, wherein the memory storing computer-executable instructions that when executed by the processor further cause the apparatus to perform:
when executing the first application:
when a second condition is detected from the second biometric data about the person, initiating a third application, wherein the second condition is different from a previous condition about the person.

8. The apparatus of claim 7, wherein the memory storing computer-executable instructions that when executed by the processor further cause the apparatus to perform:
when executing the first application:
when the previous condition is indicative that the person is experiencing an abnormal health event, generating a notification about the previous condition.

9. The apparatus of claim 6, wherein the memory storing computer-executable instructions that when executed by the processor further cause the apparatus to perform:
predicting an occurrence of a health event of the person based on the first and second biometric data.

10. The apparatus of claim 7, wherein the memory storing computer-executable instructions that when executed by the processor further cause the apparatus to perform:
determining a hazard level of an occurrence of a health event; and
generating an action from a plurality of actions based on the hazard level.

11. An apparatus supporting at least one smart application with more than one sensor to form a sensor array, the apparatus comprising:
a first thermal sensor interface configured to obtain first sensor information about a person from a first thermal sensor;
a second sensor interface configured to obtain second sensor information about the person from a second thermal sensor;
a processor for executing computer-executable instructions;
a memory storing the computer-executable instructions that when executed by the processor cause the apparatus to perform:
configuring the first thermal sensor in accordance with a first set of sensor parameters;
configuring the second thermal sensor in accordance with a second set of sensor parameters, wherein the first and second sets of sensor parameters are identical;
extracting biometric data from sensor information from all the sensors;
executing a first application to detect a health condition for a user based on the biometric data; and
in response to detecting the health condition, executing a second application to monitor the biometric data only when a thermal signature is detected for the user.

12. The apparatus of claim 11, wherein the memory storing computer-executable instructions that when executed by the processor further cause the apparatus to perform:
when executing the first application:
when a second condition is detected from the biometric data, initiating a third application, wherein the second condition is different from a previous condition about the person.

13. The apparatus of claim 12, wherein the memory storing computer-executable instructions that when executed by the processor further cause the apparatus to perform:
when executing the first application:
when the previous condition is indicative that the person is experiencing an abnormal health event, generating a notification about the previous condition.

14. The apparatus of claim 11, wherein the memory storing computer-executable instructions that when executed by the processor further cause the apparatus to perform:
predicting an occurrence of a health event of the person based on the biometric data.

15. The apparatus of claim 12, wherein the memory storing computer-executable instructions that when executed by the processor further cause the apparatus to perform:
determining a hazard level of an occurrence of a health event; and
generating an action from a plurality of actions based on the hazard level.

* * * * *